US004001743B2

United States Statutory Invention Registration [19]

[11] Reg. Number: H1743

Graves et al.

[45] Published: Aug. 4, 1998

[54] INVENTORY MANAGEMENT METHOD AND APPARATUS

[75] Inventors: Henry K. Graves, Dunwoody; Robert W. Perkins, Alpharetta; Jack Phillips Mills, Jr., Atlanta; Gerald Richard Giles, Marietta, all of Ga.

[73] Assignee: Hercules Incorporated, Wilmington, Del.

[21] Appl. No.: 406,341

[22] Filed: Mar. 17, 1995

[51] Int. Cl.[6] ..... G06F 17/60; G06F 17/00

[52] U.S. Cl. ..... 364/479.06; 364/468.01; 235/385; 395/222; 395/228

[58] Field of Search ..... 366/141; 340/605; 379/368; 358/440; 364/408, 403

[56] References Cited

U.S. PATENT DOCUMENTS

| | | | |
|---|---|---|---|
| 4,034,339 | 7/1977 | Free et al. | 395/183.21 |
| 4,336,589 | 6/1982 | Smith et al. . | |
| 4,636,950 | 1/1987 | Caswell et al. . | |
| 4,782,451 | 11/1988 | Mazzarella et al. . | |
| 4,887,208 | 12/1989 | Schneider et al. . | |
| 5,056,017 | 10/1991 | McGarvey . | |
| 5,168,445 | 12/1992 | Kawashima et al. . | |
| 5,204,821 | 4/1993 | Inui et al. . | |
| 5,261,276 | 11/1993 | Gifford . | |
| 5,305,199 | 4/1994 | LoBiondo et al. . | |
| 5,319,545 | 6/1994 | McGarvey et al. . | |
| 5,351,725 | 10/1994 | Suthergreen et al. . | |
| 5,359,522 | 10/1994 | Ryan | 364/465 |
| 5,362,948 | 11/1994 | Morimoto . | |
| 5,400,253 | 3/1995 | O'Connor . | |
| 5,586,686 | 12/1996 | Bustos et al. | 221/211 |

FOREIGN PATENT DOCUMENTS 2138947 10/1984 United Kingdom .

OTHER PUBLICATIONS

"Annunciator Sounds Off Liquid Levels", published at p. 92 of Electronic Design, vol. 37, No. 4 (Feb. 23, 1989).

A Copy of an International Search Report.

*Primary Examiner*—Bernarr E. Gregory

*Attorney, Agent, or Firm*—Mark D. Kuller; Robert P. O'Flynn O'Brien

[57] ABSTRACT

Method and apparatus for inventory monitoring a supply consumed in the manufacturing of a finished product. An inventory management system monitors the quantity of supplies in a storage facility. Based upon historical data related to the rate of usage of the supplies, the inventory management system determines the period of time until the stored supplies are depleted. If the supplies are depleted prior to a next scheduled delivery of replacement supplies, the inventory management system communicates with the supplier to move ahead the delivery date. Conversely, if the inventory management system determines that the supplies are being consumed at a rate lower than projected, the inventory management system will instruct the supplier to delay a shipment date. Supervisory personnel may access the system from a local location or a remote location. In addition, an alarm is activated when there is a sudden change in the rate of usage of the stored supplies. Provisions are included for remotely accessed the inventory management system, and for detecting the receipt of replacement supplies in order to authorize the payment for the replacement supplies.

33 Claims, 9 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

INVENTORY MANAGEMENT METHOD AND APPARATUS

BACKGROUND OF THE INVENTION

1. Field of the Invention

The present invention is directed to a method and apparatus for monitoring the inventory of materials used in the manufacture of finished products, and the ordering (replenishment) of used materials.

2. Discussion of Background and Relevant Information

Numerous materials are consumed during the course of manufacturing a finished product, such as, for example, paper. For example, in the process of manufacturing paper, a paper mill employs various chemicals to treat the wood pulp, such as, for example, bleaching the paper to obtain a desired color. Typically, these chemicals are stored in storage tanks until their use is required.

A problem arises in that the level of supplies (e.g., chemicals) in the storage tanks need to be monitored to ensure that an adequate chemical supply is available to meet the paper making requirements. Generally, chemical delivery schedules are set up based upon a past history of typical chemical usage. Alternatively, deliveries may be scheduled based upon anticipated needs.

However, the demand for the finished product (e.g., paper) can unexpectedly increase or decrease, resulting in a corresponding increase or decrease in the amounts of chemical required. As noted above, the delivery of replacement materials (i.e, new chemicals) may be made based upon past history usage of the chemicals. Thus, if a change in the usage rate of the chemical occurs, either a shortage can occur, resulting in the undesired curtailment of production, or a surplus of chemicals can occur, resulting in the undesired expenditure of capital (e.g., money) on supplies. Accordingly, it is desirable to provide a mechanism by which the delivery of new, replacement supplies can be shifted forward or delayed.

Traditionally, the ordering of new supplies (i.e., new chemicals that replace the consumed chemicals) is manually performed, in which, for example, an individual of the paper mill plant places a telephone order to a chemical supplier (i.e., chemical manufacturer/supplier). Alternatively, the individual at the paper mill plant issues a requisition form (e.g., purchase order) for the delivery of new supplies. In either case, costly human intervention is required. Accordingly, it would be desirable to provide an automatic ordering system in which new supplies are ordered with minimum human intervention.

As noted above, the materials (e.g., chemicals) are stored in storage tanks until needed. Such storage tanks are normally sealed, making it is difficult to visually determine the level of the chemicals in the storage tank. In some situations, the storage tanks may be submerged in the ground, increasing the difficulty of accurately determining the level of the chemical in the storage tank. Should a leak develop in a storage tank, large quantities of chemical can escape before personnel at the paper mill can detect the leak. As a result, a large quantity of chemical would be wasted, and a potential hazardous condition may develop.

Further, a situation may arise in which an employee at the paper mill accidently opens a valve associated with the storage tank. Alternatively, the employee may accidentally fail to close a valve that should be closed. Either situation could result in the loss of large quantities of chemical. Thus, it would be desirable to have a monitoring system that monitors the level of chemical in the storage tank, and which issues an alarm condition when the level of chemical in the storage tanks unexpectedly changes.

SUMMARY OF THE INVENTION

Accordingly, an object of the present invention is to provide a method and apparatus for automatically monitoring the level of product in the storage tanks.

Another object of the present invention is to provide a method and system for placing requests for the delivery of new supplies to replenish the used supplies.

Another object of the present invention is to provide a method and apparatus for changing a delivery schedule of new, replacement supplies based upon actual product usage of the supplies.

Another object of the present invention is to provide a method and apparatus in which the manufacturing facility can communicate requests for new supplies, shift delivery schedules, change the quantity of supplies to be delivered, etc. with a minimum of human intervention.

Another object of the present invention is to provide a method and apparatus that issues an alarm indication when an unusual condition arises.

According to a preferred embodiment of the invention, an apparatus is provided for monitoring and ordering supplies, comprising a sensor that detects a quantity of consumable supplies, means for determining usage information for a predetermined period of time related to the consumable supplies, and means for modifying scheduled deliveries of replenishment supplies based upon historical consumption rates and the detected quantity of consumable supplies. In addition, an alarm is provided that is activated when the determining means determines an abnormal condition.

According to a feature of the instant invention, the sensor comprises a differential pressure cell sensor. An output signal of the sensor is converted to a digital signal, such as an RS-232 signal.

Another feature of the present invention, provision is made for providing a local indication of the quantity of consumable supplies.

According to another feature of the instant invention, means are provided for remotely accessing the system. When the system is remotely accessed, information related to the consumable supplies are verbally conveyed to the person making the request.

Another feature of the present invention relates to the ability of the system to ascertain an operating condition of the sensor, and to issue an alarm, which may be remotely located, when an abnormal condition arises.

According to another feature of the instant invention, means are provided for acknowledging delivery of the additional supplies, so as to authorize payment for the delivered additional supplies.

According to another object of the present invention, a consumable supplies monitoring and ordering system is provided, comprising a sensor that detects a quantity of consumable supplies stored in a storage facility, in which the sensor outputs a signal related to the quantity of stored consumable supplies, a converting device that converts the output signal of the sensor to a predetermined signal, a processing unit that receives the predetermined signal to determine usage information of the consumable supplies over a predetermined period of time, the usage information being used by the processing unit to project when the consumable supplies will be completely depleted, and means for communicating with a supplier of the consumable supplies to modify a scheduled delivery of additional consumable supplies, based upon the projection of when the consumable supplies will be completely depleted, if the scheduled delivery would result in an undesirable quantity of stored consumable supplies.

According to a feature of the present invention, a local alarm is provided that is activated when the converting device fails to provide the predetermined signal to the processing unit. In addition, a remote alarm is provided that is activated at the same time that the local alarm is activated. The remote alarm comprises a visual alarm indicator and an audible alarm, and includes means for disabling the audible alarm.

Another feature of the present invention pertains to the ability to access the processing unit from a remote location using, for example, a touch-tone telephone. The processing unit provides verbal instructions and responses based upon the sent touch-tone signals.

According to another feature of the present invention, the processing unit issues notifications to the supplier, by, for example, facsimile, reporting conditions of the monitoring and ordering system. Additionally, additional communications are issued if the supplier fails to respond to a previously issued communication within a predetermined period of time.

According to another feature of the present invention pertains to the ability to compile history data pertaining to the usage of the consumable supplies over time. The history data is used to adjust future scheduled deliveries of additional consumable supplies.

According to another feature of the instant invention, a printer is provided that provides a printout of said history data.

According to another feature of the instant invention, a warning notice is issued when the processing unit determines that the usage of consumable supplies exceeds a usual consumption rate. In addition, a warning notice is issued when the usage of the consumable supplies is less than a usual consumption rate.

Another feature of the instant invention is that means are provided for producing a second predetermined signal which is supplied to a usage indicator associated with the storage facility.

According to another object of the present invention, a monitoring and ordering system is provided that comprises a sensor that detects a quantity of supplies, means for determining usage information of the supplies for a predetermined period of time based upon the quantity of supplies detected by the sensor, and means for scheduling deliveries of additional supplies based upon a rate of consumption of the supplies, in accordance with the usage information determined by the determining means and the quantity of supplies detected by the sensor.

According to another object of the present invention, a method is provided for monitoring and ordering supplies stored in a storage facility, comprising the steps of sensing a quantity of supplies stored in the storage facility, determining a rate at which the stored supplies are consumed, ascertaining a modified delivery request schedule of replacement supplies based upon the sensed quantity of stored supplies and the rate at which the stored supplies are being consumed, and communicating the modified delivery request schedule to a supplier of the supplies.

According to a feature of this invention, monitoring personnel are notified when a sudden change occurs in the rate at which the stored supplies are consumed. If the monitoring personnel fail to acknowledge receipt of an initial notification within a predetermined period of time, additional notifications are issued.

According to another feature of the instant invention, an alarm is activated when an abnormal condition arises.

Additionally, the method of the present invention compiles historical data pertaining to usage of the supplies over time.

BRIEF DESCRIPTION OF THE DRAWINGS

The foregoing and other objects, features, and advantages of the invention will be apparent from the following more particular description of a preferred embodiment of the invention, as illustrated in the accompanying drawings, in which reference characters refer to the same parts throughout the various views, and wherein.

DESCRIPTION OF THE PREFERRED EMBODIMENT

Figure 1:
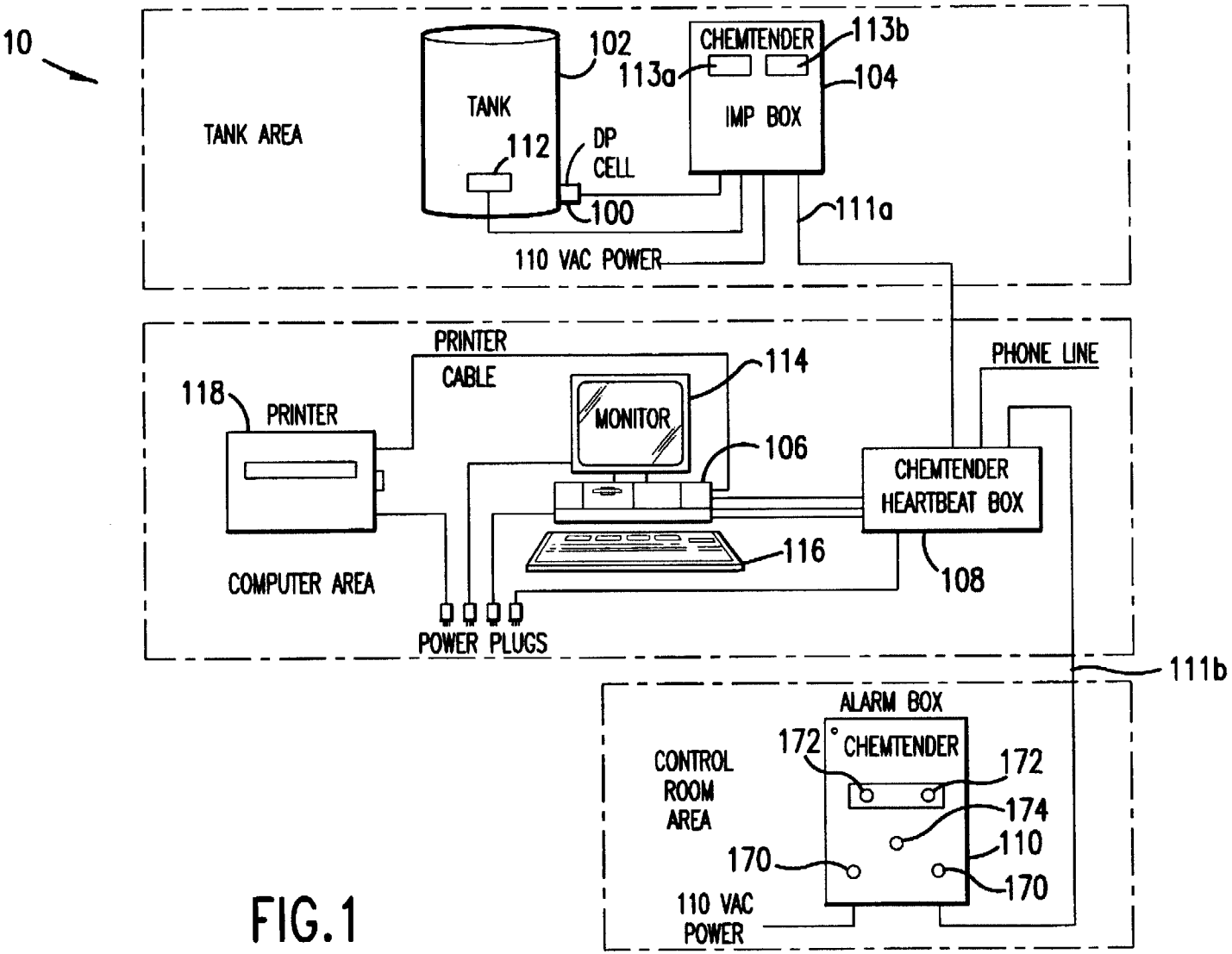
FIG. 1 illustrates a block diagram of an inventory management system according to a preferred embodiment of the instant invention.

FIG. 1 illustrates an inventory management apparatus 10 of the present invention. While the present invention is designed to operate with a plurality of manufacturing facilities, and to monitor the level of chemicals in a plurality of storage tanks, the following description will be provided with respect to a single paper mill plant and a single storage tank. However, it is understood that the present invention may be used with several manufacturing facilities and/or several storage tanks. Additionally, the present invention is not limited to monitoring the level of chemicals in a storage tank, but may also be employed to monitor, for example, the number of headlights that are available at an automobile manufacturing plant. Thus, any consumable supplies can be monitored, and based upon the historical rate at which the supplies are consumed, modification of scheduled deliveries can be made based upon expected rates of consumption and usage information.

The inventory management apparatus 10 comprises a sensor 100 associated with a storage tank 102, an IMP (Intelligent Meter for Process) interface module 104, a processing unit 106, a Heartbeat Box module 108 and a Control Room Alarm Box module 110. The processing unit 106 additionally includes a monitor 114, keyboard 116, local printer 118 and a plurality of communicating means (to be described below) that enable personnel of the paper mill to communicate with the chemical supplier.

Figure 2A:
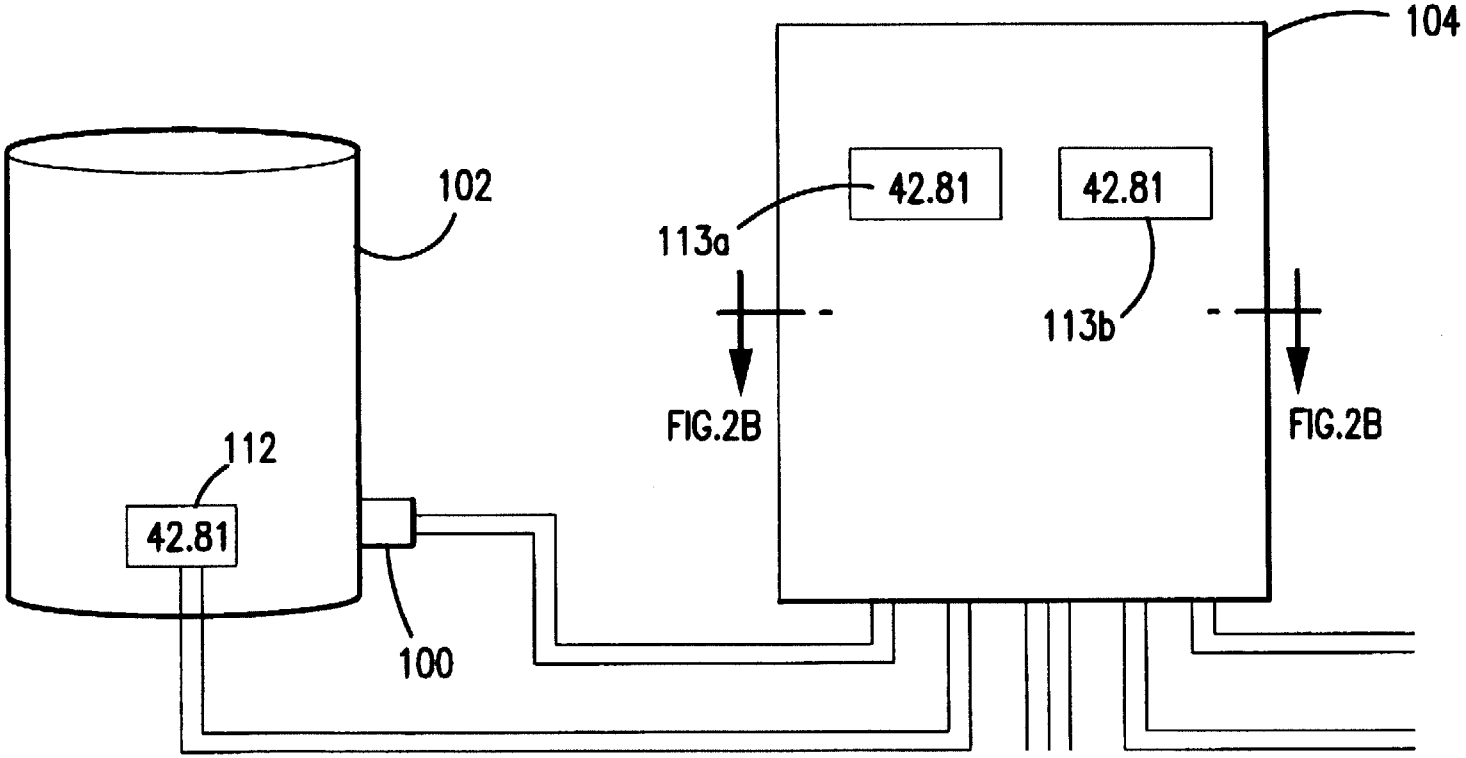
FIG. 2A illustrates a storage tank and IMP interface module employed with the embodiment of FIG. 1.
Figure 2B:
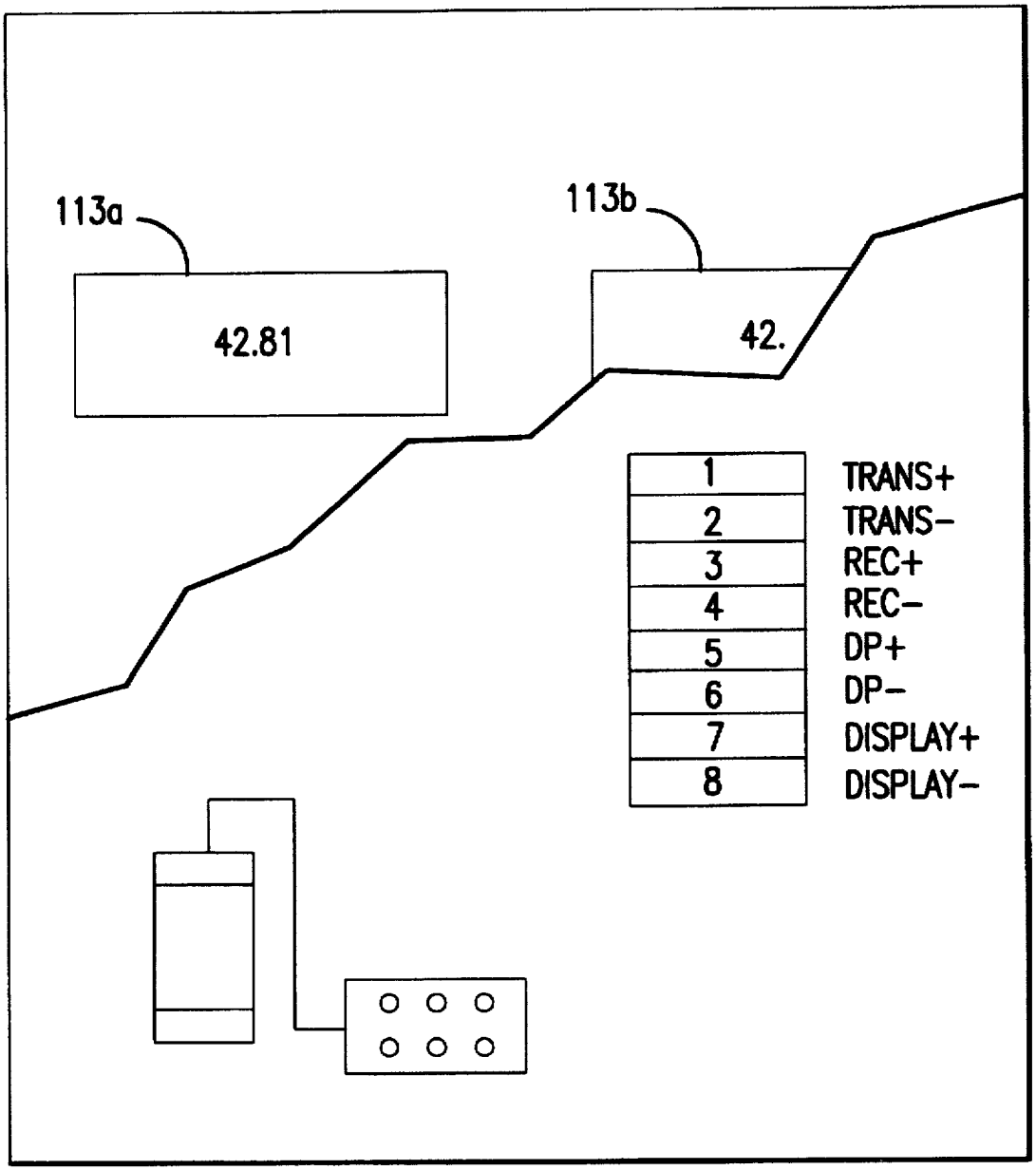
FIG. 2B illustrates a cut-away view of the IMP interface module of FIG. 2A along lines A—A.

FIG. 2A illustrates a connection configuration of the IMP Interface module 104 with respect to the storage tank 102. A level of the chemical in the storage tank 102 is electrically measured by sensor 100, which may be, for example, a differential pressure cell sensor that produces a scalable signal in the range of approximately 4–20 mA. Rosemont, Inc. manufactures a suitable sensor, which is available as part number 1551LT45A0A22D. Preferably, provisions are provided to enable the calibration of the differential pressure cell sensor 100 prior to the beginning of monitoring the chemical level in the storage tank 102. The IMP interface module 104 functions to convert the 4–20 mA signal from the sensor 100 to an RS-232 signal. The IMP interface module 104 employs, for example, a universal asynchronous receiver-transmitter (UART), such as manufactured by Red-Lion, to convert the analog scalable 4–20 mA signal to an addressable RS-232 signal. The RS-232 signal is provided at terminals 1–4 of the IMP interface module (see FIG. 2B), which is interfaced to the processing unit 106 via the Heartbeat Box module 108. In the preferred embodiment, the signal inputted to the processing unit 106 is converted to a percentage value of the storage tank capacity by the IMP interface module 104.

It is noted that sensors other than a differential pressure cell sensor may be employed. For example, a sensor may be employed that determines the amount of chemical in the storage tank 102 based upon the weight of the chemical in the storage tank. Further, different types and combinations of sensor can be employed to measure different types of supplies; for instance, a light sensor or a weight sensor may be employed to determine the quantity of goods, such as working headlights in storage at an automobile facility.

The IMP interface module 104 also regenerates the 4–20 mA signal to drive a pre-existing display 112 associated with the storage tank 102, thus providing a local visual indication of the chemical level in the storage tank 102.

In addition, the IMP interface module powers one-half of the RS-232 loop between the IMP interface module 104 and the Heartbeat Box module 108 (with the Heartbeat Box module powering the other one-half of the RS-232 loop). For example, the IMP interface module can supply electrical power to the transmit section of the RS-232 loop, while the Heartbeat Box module 108 supplies electrical power to the receiver section of the RS-232 loop. Alternatively, the IMP interface module can supply electrical power to the receiver section of the RS-232 loop, while the Heartbeat Box module 108 supplies electrical power to the transmit section of the RS-232 loop.

The IMP interface module 104 is located proximate the storage tank 102 being monitored, but preferably within approximately four thousand feet of the Heartbeat Box module 108. As noted above, the IMP interface module 104 receives the 4–20 mA signal from the differential pressure cell sensor 100 and generates an indicator signal that is used to control the pre-existing indicator 112. The IMP interface module also includes switching means (not shown), such as, for example, a switch, that permits the IMP interface module 104 to be bypassed if a component failure in the IMP interface module 104 occurs. In addition, the IMP interface module 104 includes a visual indicator that provides a visual indication of the amount of chemical in the storage tank 102, as detected by the sensor 100.

The present invention is capable of monitoring a plurality of storage tanks. The IMP interface module 104 illustrated in FIGS. 1 and 2 is designed to monitor two storage tanks, and accordingly, includes two visual indicators 113*a* and 113*b*.

In the preferred embodiment, the processing unit 106 comprises a microprocessor based computer, such as, for example, an IBM PC compatible computer employing an INTEL 80486 microprocessor. The processing unit 106 includes a plurality of expansion slots (not shown) that permit a plurality of expansion cards, such as, for example, modems, facsimile machines, sound cards, voice cards, etc., which will be discussed below, to expand the functionality of the processing unit 106. In addition, the processing unit 106 includes an I/O expansion card (not shown) that plugs into a free expansion slot of the processing unit 106 to provide a plurality of serial ports, at least one parallel port and a mouse port. The processing unit 106 also includes a monitor 114 that provides a visual indication of information related to the inventory management system, a keyboard 116 that allows an individual of the paper mill to input data into the system, and a printer 118 that provides a hardcopy printout of relevant data, such as the level of the chemical in the storage tank over time, and to provide a vital record of information from the processing unit 106, such as, for example, the next scheduled delivery date and time.

The printer 118 is connected to the parallel port of the I/O expansion card to print a daily management report indicating the hourly condition of the storage tank 102, and the reason for any alarm may have been issued. The hourly printing of the storage tank level may be used, for example, to enable the determination of the severity of a problem with the storage tank 102.

It is noted that other types of processing units can be employed without departing from the scope and/or spirit of the instant invention.

The processing unit 106 of the instant invention continuously receives storage tank level data and projects storage tank levels based upon usage of the chemical stored therein. The received data is analyzed by the processing unit 106 to determine the rate at which the chemical is used. The determined rate of chemical usage is stored in a database (discussed below) to produce a historical record of consumption, such as, for example, chemical consumption. The processing unit 106 preferably receives and evaluates data on a twenty-four hour usage rate. However, the processing unit 106 can receive storage tank level data for less than twenty-four hours a day without departing from the scope or spirit of the instant invention.

Using forecasting algorithms, such as, for example, examining the quantity of chemical used over a predetermined period of time, the amount of chemical to be used during a future predetermined time period can be estimated. Purchase order releases are scheduled and transmitted to the chemical supplier based upon these estimates.

The processing unit 106 also continuously monitors the various components of the inventory management system to assure system reliability. Normally, the processing unit 106 periodically issues a print statement over one of its serial ports that is used to produce a "heartbeat" signal (which is discussed below, with respect to the Heartbeat Box module 108). Should a malfunction occur, the processing unit 106 stops issuing the print statement, so that an alarm is activated, such as alarms associated with the Control Room Alarm Box module 110, and control is returned to a manual monitoring mode, in which an individual personally monitors the level of chemical in the storage tank 102.

The processing unit 106 includes a voice card (not shown), such as model number D/21D manufactured by Dialogic, that also plugs into a free expansion slot in the processing unit 106. The voice card enables authorized personnel to access the processing unit 106 and receive verbal information as to the real time storage tank level and next scheduled delivery information from a remote location using a conventional touch-tone telephone. In the preferred embodiment, the chemical supplier confirms the schedule of shipments to the processing unit 106 by means of an interactive mode of the voice card module (which will be discussed below).

The processing unit 106 of the preferred embodiment further includes a facsimile and modem interface card (not shown), such as, for example, a Satisfaction 400 facsimile/modem card manufactured by Intel Corporation, that plugs into an available expansion slot in the processing unit 106 to provide a facsimile and/or modem link to at least one facsimile machine and/or pager, so that a facsimile transmission and/or pager communication can take place. A standard touch-tone telephone line connects a switched access telephone network to the facsimile/modem interface card plugged into the expansion slot of the processing unit 106. The switched access telephone network may be either a Private Branch Exchange (PBX) system or a conventional Central Office (CO) line. The only requirement is that the telephone number assigned to the facsimile/modem expansion card must be accessible both inside and outside the customer's facility.

In the preferred embodiment, communications take place between the chemical supplier and the customer (e.g., paper mill) when placing orders for the delivery of replenishment chemicals, to confirm the receipt of a delivery, to change a delivery date, and to notify the chemical supplier of an alarm condition. However, the processing unit 106 can communicate with the chemical supplier to relay additional information, such as, for example, the rate at which the chemical in the storage tank is being consumed.

In addition, the processing unit 106 of the instant invention can control, for example, one or more valves (not shown) associated with the storage tank 102 in response to the detection of an abnormal condition. For example, the processing unit 106 can close an outlet valve associated with the storage tank 102 to prevent the withdrawal of chemical from the storage tank 102 if the processing unit 106 determines that an abnormal condition (such as, for example, a too great rate of chemical usage) occurs. The processing unit 106 can also close an inlet valve associated with the storage tank 102 if the processing unit 102 determines that an abnormal condition (such as, for example, the chemical level in the storage tank 102 is too high) to prevent the introduction of replacement (replenishment) chemical. In addition, the processing unit 106 can operate the inlet valve associated with the storage tank 102 to permit (or deny) the entry of materials into the storage tank, in response to, for example, a delivery truck driver inputting a valid entry code. Alternatively, if the processing unit 106 detects an abrupt decrease in the storage level of the chemical in the tank, signifying, for example, a rupture of the storage tank, the processing unit 106 can issue a command to, for instance, release a neutralizing agent so as to neutralize the chemical in the storage tank and prevent the occurrence of a hazardous condition.

The processing unit 106 executes a specially designed program, to be described below, that may be generic in nature for several customers or customized for a particular customer (e.g., paper mill).

Figure 3:
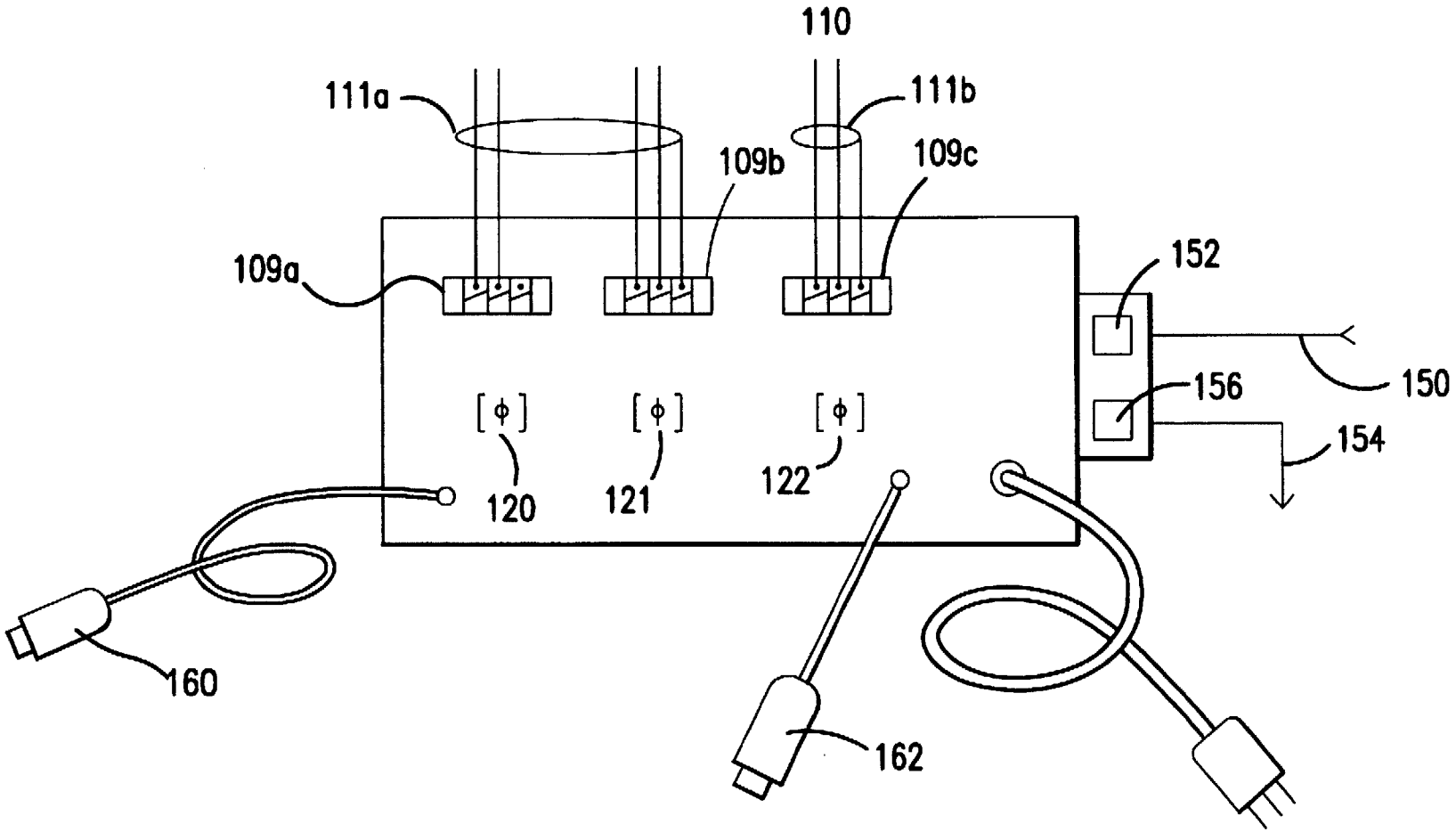
FIG. 3 illustrates a Heartbeat Box module employed with the embodiment of FIG. 1.

The Heartbeat Box module 108 (shown in FIG. 3) is preferably installed in the vicinity of the processing unit 106, and functions to interface the various components of the inventory management system and communication lines to the processing unit, so as to facilitate and/or control the exchange of various signals between the processing unit 106, a telephone line (discussed below), Control Room Alarm Box 110 and IMP interface module 104.

The Heartbeat Box module 108 includes a plurality of connectors 109*a* and 109*b* for transmitting and receiving data from the IMP interface module 104, respectively. One end of a two pair twisted wire cable 111*a* is connected to connectors 109*a* and 109*b*. The remaining end of cable 111*a* is connected to terminals 1–4 of the IMP interface module. One end of a single pair twisted wire cable 111*b* is connected to connector 109*c* on the Heartbeat Box module 108, while the remaining end of the cable 111*b* is connected to the Control Room Alarm Box 110.

One end of a telephone cable 150 is plugged into a wall telephone jack that is connected, for example, to the Central Office (CO) line of the telephone company. The other end of the telephone cable 150 plugs into a jack 152 on the Heartbeat Box module 108. A second telephone cable 154 is connected to a jack 156 on the Heartbeat Box module 108 and a jack labelled "Telephone Line In" (not shown) on the facsimile/modem card. In the preferred embodiment, jacks 152 and 156 (along with the jack associated with the facsimile/modem card) comprise, for example, single line RJ-11 telephone jacks. However, the present invention may also be used with multiple line telephone jacks, such as, for example, RJ-45 jacks, and/or with multiple telephone lines (in which event a plurality of jacks are provided) when a plurality of storage tanks and/or facilities are being monitored.

A surge protector (not shown) is connected across the terminals of the jacks. The surge protector functions to protect the facsimile/mode card from damaging electrical currents that may result, for example, when lighting strikes a telephone line running from the telephone company's office to a customer's site.

A 9 pin serial (RS-232) cable 160 and 25 pin serial (RS-232) cable 162 of the Heartbeat Box module 108 are connected to respective serial ports of the I/O expansion card (discussed above). These cables interface the Heartbeat Box module 108 to the processing unit 106 to permit the exchange of data therebetween.

The Heartbeat Box module 108 powers one-half of the RS-232 loop (discussed above with regard to the IMP interface module 104) and controls the communication between the sensor 100, processing unit 106 and Control Room Alarm Box module 110. According to the preferred embodiment of the instant invention, processing unit 106 issues a print statement every predetermined period of time, such as, every two seconds, that is outputted via a serial port (associated with the processing unit 106) to the Heartbeat Box module 108. The signal is then amplified by an amplifier in the Heartbeat Box module 108. The amplified signal is supplied to "heartbeat" indicator 120 on the Heartbeat Box module 108, which periodically flashes when all the elements of the inventory management system 10 are properly functioning, presenting a visual representation of the "heartbeat" signal.

The amplified signal is also supplied to a single shot re-triggerable timer (also referred to as a re-triggerable single shot relay) in the Heartbeat Box module 108, such as, for example, part number E1594F21A, Code 3393X manufactured by SSAC. Preferably, the single shot re-triggerable timer includes an adjustable time delay, such as, for example, ten seconds. When the print statement is issued by the processing unit 106 to the Heartbeat Box module 108, the re-triggerable timer is re-set. However, if an abnormal condition occurs (such as, for example, an abrupt change in the usage rate of the stored chemical, failure of the IMP interface module 104 to receive a response from the sensor in response to a polling request, the level of the chemical in the storage tank 102 being too high or too low, etc.), the processing unit 106 stops issuing the print statement. Thus, the re-triggerable timer times out, and an alarm control circuit in the Control Room Alarm Box 110 changes state, so as to activate an alarm.

In the preferred embodiment, the alarm control circuit comprises a relay, in which the coil is energized while the "heartbeat" exists, and wherein the coil of the relay is de-energized when the re-triggerable timer times out. In the preferred embodiment, the relay is configured so that the alarm (e.g., alarms 170 and 172 in the Control Room Alarm Box 110) is not activated while the relay is energized, so that, if, for example, the connection between the Heartbeat Box module 108 and the Control Room Alarm Box 110 is interrupted, an alarm will be produced. However, the present invention can be configured to energize the relay to activate the alarm without departing from the spirit and/or scope of the instant invention. Further, the alarm control circuit may be associated with the Heartbeat Box monitor without departing from the spirit and/or scope of the instant invention.

According to the preferred embodiment, when a problem condition arises, the "heartbeat" signal is terminated, and the visual indicator 120 stops flashing. Audible alarm (e.g., siren) 170 and visual alarm (e.g., flashing light) 172 associated with the Control Room Alarm Box 110 (to be discussed below) are then activated.

The Heartbeat Box module 108 also includes a visual alarm indicator (e.g., an alarm light) 121 and a manual monitor indicator 122. The visual alarm indicator 121 is preferably triggered at the same time that the alarm in the Control Room Alarm Box 110 is actuated. The manual monitor indicator 122, which is illuminated to inform personnel that the storage tank inventory must be manually monitored, can be activated at the same time as the visual alarm indicator 121, or can be activated at a set time delay (such as, for example, two hours) after activation of the visual alarm indicator 121. A timer circuit may be employed, for example, to determine when to illuminate the manual monitor indicator 122.

The Control Room Alarm Box module 110 of the preferred embodiment is located in a control room that is remote from the processing unit 106 and IMP interface module 104, and functions to alert supervisory personnel that an abnormal condition exists that requires attention. In the preferred embodiment, the Control Room Alarm Box module 110 is located within three thousand feet of the Heartbeat Box module 108.

The Control Room Alarm Box 110 comprises the audible alarm 170 and visual alarm 172. When an abnormal condition arises, the alarms are activated by the alarm control circuit (discussed above with respect to the Heartbeat Box module 108) so that a supervising individual will immediately be made aware of the fact that the inventory management system 10 is no longer able to automatically manage the storage tank inventory. The Control Room Alarm Box module 110 is located in an area where it can be constantly supervised by the individual.

The Control Room Alarm Box module 110 further comprises means for disabling the audible alarm indicator, such as, for example, a switch 174, that can be manipulated to acknowledge the alarm condition and silence the alarm. However, it is noted that the preferred embodiment of the instant invention does not deactivate the visual alarm indicator 172 when the disabling means is manipulated, so that the supervising individual remains informed that the storage tank must be manually monitored. In addition, after a user settable predetermined time delay (such as, for example, two hours), the visual alarm indicator 172 preferably begins flashing to convey the urgency of the emergency condition and the need to manually monitor the level of the chemical in the storage tank.

Figure 5:
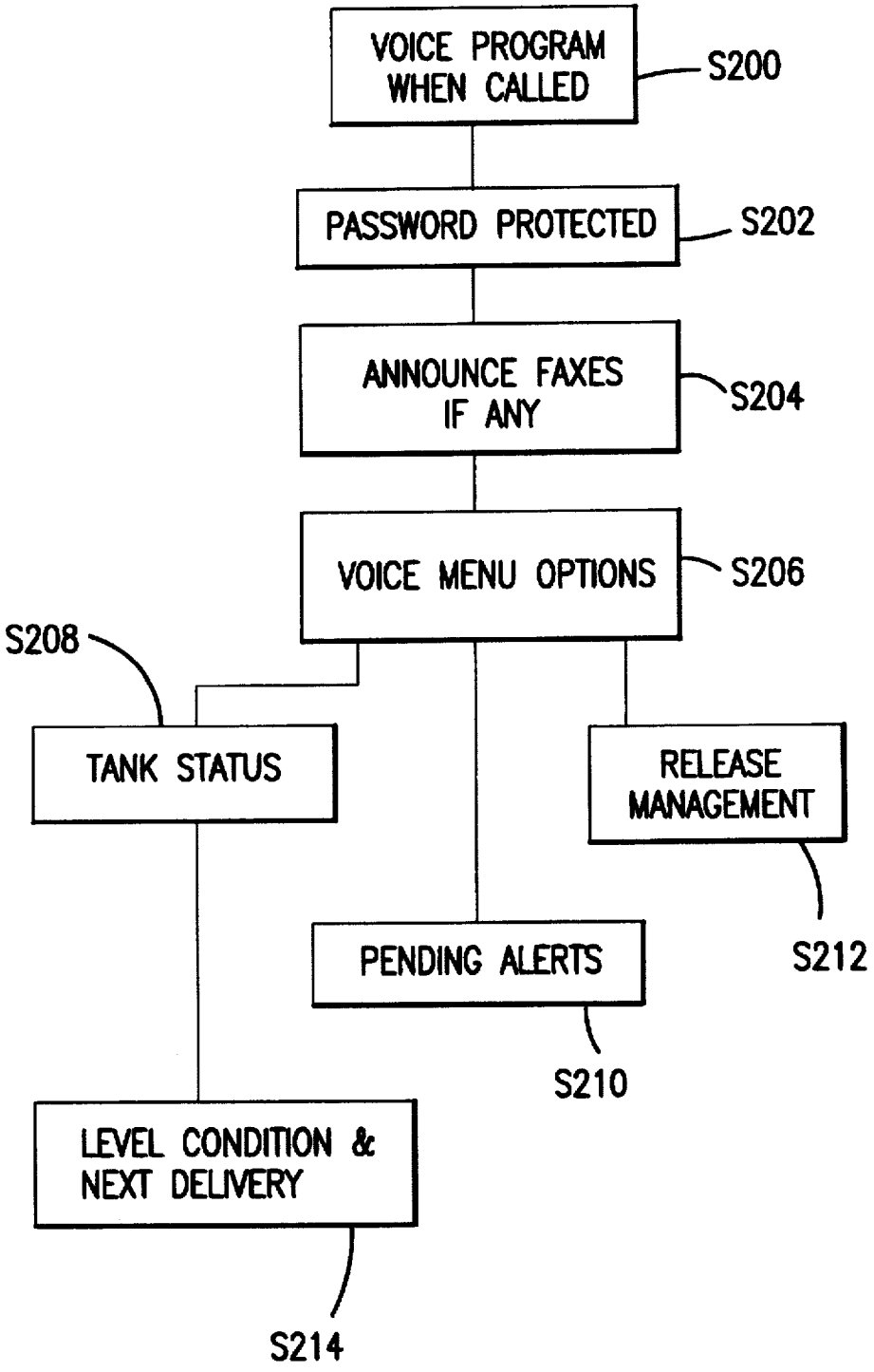
FIG. 5 illustrates a flow chart of a Voice Program executed by the processing unit of the preferred embodiment.

The inventory management system 10 exchanges information with supervisory personnel via a plurality of visual displays on the monitor 114, the printer 118, facsimiles, and a voice menu interface provided by a Voice Program (to be discussed below with respect to FIG. 5). If the inventory management system 10 is unable to communicate with the supervisory personnel via the monitor, printer, facsimile machine or voice menu interface (or an emergency condition arises), the "heartbeat" (e.g., a signal that is periodically generated when all elements of the system are functioning properly) is disabled and the audible 170 and visual alarms 172 on the Control Room Alarm Box module 110 are activated.

Facsimiles issued by the processing unit 106 to the chemical supplier can be categorized in one of three areas: administrative facsimiles, notification facsimiles, and alarm facsimiles.

Administrative facsimiles are related to chemical replenishment orders, chemical release schedules or delivery dates. Administrative facsimiles also include facsimiles reporting a low release count on a purchase order, and a facsimile reporting that there are no remaining releases (shipments) on a particular purchase order.

In the preferred embodiment, hourly print-outs are provided of the level of the monitored storage tank 102, along with the next scheduled product delivery date. At midnight, the instant invention provides a daily summary printout indicating the quantity of chemical in the storage tank 102 that was expended, messages that were sent during the preceding twenty-four hour time period, and the number of responses to those messages. It is understood that this arrangement can be varied without departing from the scope and/or spirit of the present invention.

The monitor 114 reflects the majority of activities that take place with regard to the management of the product inventory. Additional detail information is available through keyboard queries. In this regard, it is noted that the preferred embodiment provides a voice mail reminder that is associated with each facsimile that briefly specifies the reason the facsimile was issued. This voice mail reminder is provided when a supervisory individual inputs a password at the keyboard 116 of the processing unit 106, as will be discussed below.

The inventory management system 10 predicts storage tank product levels based on forecasted and actual usage rates. For example, on a predetermined day of the week, such as, for example, every Tuesday morning, the inventory management system 10 of the present invention evaluates the need to release (ship) additional chemicals for shipping to the customer (e.g., paper mill) in the forthcoming week, which covers the time period, for example, from Sunday to Saturday.

The inventory management system 10 compares the projected usage level to the actual usage level every predetermined time period, such as, every three hours. If a significant disparity arises, the inventory management system 10 determines whether a low product level will occur, or whether the storage tank 102 can hold the full quantity of chemical scheduled to be shipped. Based upon these evaluations, appropriate shifts (changes) are made to the delivery schedule and/or quantity.

Notification facsimiles are issued to advise the customer (e.g., the paper mill) of non-emergency conditions related to the storage tank 102. For instance, the preferred embodiment of the instant invention issues a notification facsimile alerting personnel at the paper mill of expected chemical usage rates, including notifications of time periods in which (a) no chemical was consumed, (b) a low chemical consumption rate existed, (c) a normal chemical consumption rate existed and (d) a high chemical consumption rate existed.

Notification facsimiles are also issued by the preferred embodiment of the instant invention to report when a filling operation of the storage tank 102 begins, and when the filling operation is completed. Chemical replenishment deliveries that are not received during the expected time are noted by the processing unit 106, which issues a late delivery facsimile, or an early delivery facsimile, as the situation warrants.

The inventory management system 10 calculates the volume of the chemical that was delivered to validate that a complete delivery has been received. A notification facsimile is issued if it is determined that the amount of delivered supplies (e.g., chemical) is insufficient (e.g., less than the amount that was supposed to be delivered).

A notification facsimile is also issued when a condition that activates an alarm is remedied, so that all affected personnel are informed that the alarm condition no longer exists.

The occurrence of an alarm condition signifies that a significant event has occurred which requires immediate human intervention. Accordingly, if an alarm condition is not resolved in a timely manner, the inventory management system 10 reverts to a manual monitoring mode of operation (e.g., a non-automated operating mode in which an individual personally monitors the level of chemical in the storage tank 102). In the preferred embodiment of the instant invention, alarms are generated when a predetermined unexpected low fluid level, or predetermined unexpected high fluid level is reached in the storage tank 102. An alarm is also issued if the inventory management system 10 is unable to read the level of the product in the storage tank 102, due, for example, to a malfunction of the differential pressure cell sensor 100.

An alarm is also issued if the usage rate of the chemical in the storage tank 102 exceeds a planned high level. In such a situation, an excessive usage alarm is issued to alert supervisory personnel of a potential problem, such as, for example, a leak in the storage tank.

Figure 7:
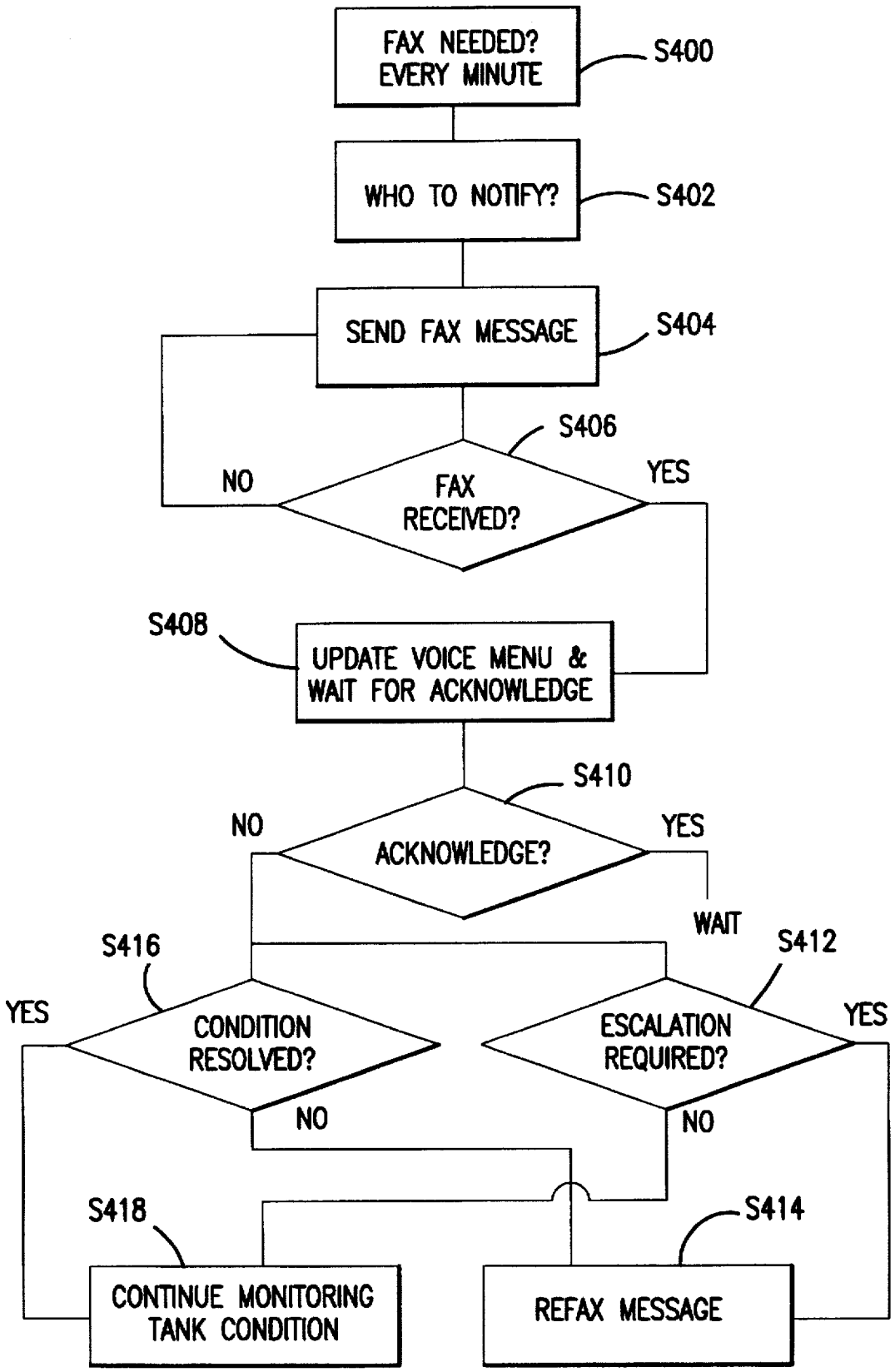
FIG. 7 illustrates a flow chart of a Facsimile Program executed by the processing unit of the preferred embodiment.

Once an alarm condition is identified and a notification facsimile is issued by the processing unit 106, the receiver of the facsimile (e.g., supervising personnel) must acknowledge taking responsibility for the action described in the alarm facsimile. If an acknowledgement facsimile (discussed below with respect to the Facsimile Program of FIG. 7) is not received from the individual responsible for supervising the operation of the system within a prescribed period of time, the processing unit 106 of the preferred embodiment of the instant invention issues additional alarm facsimiles to additional individuals, such as, for example, a plant supervisor.

If the severity of an alarm condition exceeds a predetermined threshold, the "heartbeat" of the Heartbeat Box module 108 is stopped, and the audible and visual alarms associated with the Control Room Alarm Box module 110 are activated. As previously noted, the audible alarm can be silenced by manipulating an associated alarm acknowledge switch (disabling means). However, as noted above, the visual alarm remains illuminated until the "heartbeat" is restored. After a user settable predetermined time delay (such as, for example, two hours), the Control Room Alarm Box module 110 preferably flashes indicators 172 mounted on the Control Room Alarm Box module 110 to convey to the paper mill personnel that an emergency condition exists and that the level of the storage tank 102 must be manually monitored.

Preferably, the paper mill personnel will attempt to contact the processing unit 106 (by, for example, telephone) when an alarm, such as, for example, alarm 170, is activated, to obtain a brief description of the problem. If the mill personnel cannot reach the processing unit 106 by telephone, the individual responding to the alarm must walk to the processing unit 106 to determine whether a message was printed by the printer 118 associated with the processing unit 106 indicating the reason for the disabling of the "heartbeat".

The individual responding to the alarm determines the urgency of the alarm by reviewing the last printed hourly storage tank level data, usage rate data, and time and date of the next scheduled delivery.

As noted above, the Heartbeat Box module 108 may include a visual alarm indicator 121 that is actuated when the "heartbeat" indicator 120 is disabled. The Heartbeat Box module 108 does not include an audible alarm; only a visual alarm 121 is provided. The manual monitoring indicator 122 may be activated at the same time that the visual alarm indicator is triggered, or a predetermined period of time (such as, for example, two hours) after the visual alarm indicator has been triggered, so as to indicate that the storage tank 102 must be manually monitored. Further, it is understood that the Heartbeat Box module 108 may be modified to include an audible alarm indicator without departing from the spirit and/or scope of the present invention.

The addition, deletion, and shifting of chemical releases (e.g., shipments to the paper mill) are made via the keyboard 116 and monitor 114 associated with the processing unit 106. The keyboard 116 and monitor 114 may also be manipulated to determine features of the chemical stored in the storage tank 102, such as, for example, projected usage rates, and notification of alarm parameters.

The processing unit 106 can also be remotely accessed using the voice card installed in the expansion slot of the processing unit 106. In this situation, a voice menu is provided requesting entry of a digit password, using a keypad of a touch-tone telephone (not shown). In the preferred embodiment, up to a seven digit code and the pound (#) key is entered on the touch-tone keypad of the telephone. The pound key is pressed to signify the end of a string of inputted data. After the processing unit 106 authorizes the password, the processing unit 102 guides the user through a series of voice prompts. For example, the preferred embodiment of the instant invention instructs an authorized user to press "1" on the touch-tone telephone keypad to determine a storage tank status, "2" to determine all pending alerts, "3" to change a release schedule, "9" to repeat the voice prompts, or the "#" key to exit.

Further, the preferred embodiment of the inventory manager system 10 automatically alerts the user (after his/her authorization has been verified) of any alerts for which he/she is responsible. After a first alert is played, the user is given the option of listening to any remaining alerts, or going directly to the main menu. The processing unit 106 "marks" played messages so that they are not re-played the next time the user accesses the system.

As noted above, the inventory management system 10 comprises the processing unit 106 that executes a series of routines (to be described below), the Heartbeat Box module 108 that is located in the vicinity of the processing unit 106, the IMP interface module 104 that is located proximate the sensor 100 and storage tank 102, and the Control Room Alarm Box module 110 that is located in a third area (e.g., a monitoring room). In the preferred embodiment, the processing unit 106 is connected to the IMP interface module 106 and Control Room Box module using eighteen gauge twisted pair wire. Further, the processing unit 106 is located within four thousand feet of the IMP interface module 104, while the Control Room Alarm Box module 110 is located within three thousand feet of the processing unit. However, if the various elements must be distanced farther apart than these specified distances, it is only necessary to revise the input and output circuits of the various modules. Accordingly, the distance of the various elements can be varied without departing from the scope and/or spirit of the instant invention.

The operation of the processing unit 106 is controlled by a series of routines. In the preferred embodiment, the processing unit 106 employs a multi-tasking operating system, such as Desqview, manufactured by Quarterdeck Office System. This operating system permits a plurality of tasks to "run" simultaneously in separate windows. The five main routines executed by the processing unit 106 comprise an Interface Program, a Voice Program, a Tank read Program, a Facsimile program, and a Timer Program. For purposes of clarity, each routine will be discussed separately. However, it is understood that each routine is executing as a separate task under Desqview, and can be called to the foreground at any time.

Interface Program

Figure 4:
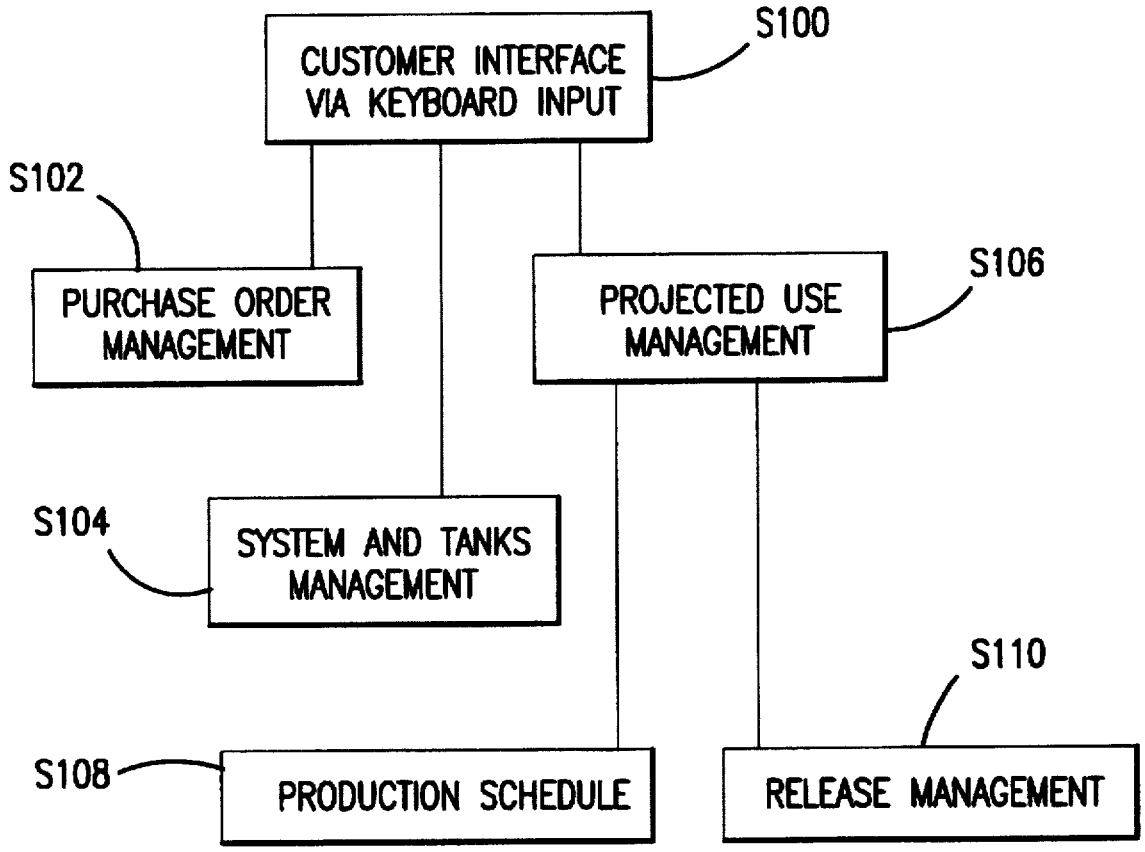
FIG. 4 illustrates a flow chart of an Interface Program executed by a processing unit of the preferred embodiment illustrated in FIG. 1.

The Interface Program (FIG. 4) permits a user to access the inventory management program. The Interface Program enables an individual to review projections and storage tank characteristics, and to perform administrative functions.

Initially, an individual inputs a password (step S100) using the keyboard 116. The processing unit 106 then determines whether the password is authorized. If the password entered at the keyboard is not valid, processing returns to the main program, preventing the person that inputted the invalid password from gaining entry to the inventory management system.

On the other hand, if the inputted password is valid, the individual is permitted entry to the system, and the processing unit 106 briefly reports to the user facsimiles that were issued and the reason for their issuance. Thereafter, the individual is able to review projections with respect to forecasted and actual usage rates of the chemical in the storage tank, the need for new chemicals in the forthcoming week, changing of delivery schedules, etc. (steps S102–S110).

Step S102 is executed when the user wishes to enter a Purchase Order Management mode, in order to examine and/or modify chemical purchases and/or delivery schedules. The user can also select a System and Tanks Management mode (step S104) that enables the user to examine records (such as, historical records, discussed below, with respect to a Level 1 database and a Level 2 database) pertaining to the level of chemical in the storage tank 102 over time.

Alternatively, the user can select a Projected Use Management mode (step S106) to review information related to, for example, the rate of usage of the chemical in the storage tank. When this mode is selected, the user is given the option of selecting a Production Schedule mode that discloses, for example, how much chemical is anticipated to be required (step S108), or a Release Management mode that discloses, for example, when replenishment chemicals are to be delivered (step S110).

It is noted that the processing unit 106 of the present invent may also be remotely accessed and controlled. For example, a remote user may "call" the processing unit 106 and input an ID code to identify himself/herself. Thereafter, the processing unit 106 terminates the call and determines determine whether the caller is an authorized user. If the caller is an authorized user, the processing unit 106 calls back the authorized user by calling, for example, a telephone number associated with the authorized caller that is stored in a database file associated with the processing unit 106, enabling the authorized user to remotely access the inventory management system. Alternatively, a supervisory person may manually input a code at the keyboard 116 to grant a remote user access the inventory management system.

Voice Program

The Voice (phone) Program (FIG. 5) controls the operation of the voice card plugged into an expansion card of the processing unit 106. The voice card accepts telephone calls and queries the caller to enter an ID code, followed by the pound (#) key using the key pad of a touch-tone telephone.

After the caller enters an ID code, the processing system determines whether the ID code is valid (steps S200 and S202). If the ID code is invalid, a counter is incremented by a predetermined value, such as 1 and a determination is made as to whether the counter has reached a predetermined maximum count value. If the ID code is invalid and the predetermined maximum count value has not been reached, the processing system loops back to step S200 and requests that the user again input an ID code for verification.

If the processing unit 106 determines that the predetermined maximum count has been reached, the processing unit 106 terminates the telephone connection.

When the processing system determines that a valid ID code has been entered, use of the voice system to manipulate the inventory management system is permitted. However, before the user is permitted to enter queries, the processing unit 106 compares the entered ID code to the ID code associated with any facsimiles that may have been sent to determine whether any facsimiles for the authorized caller were sent (step S204). If the processing unit determines that facsimiles were sent to the caller, the voice card is manipulated to provide a brief review of the facsimile and to request that the caller accept responsibility for the condition described therein.

Once the caller accepts responsibility for the condition described in the sent facsimile, the caller is provided with a vocal menu (step S206) providing the caller the option of (1) learning a current status of the storage tank (step S208), (2) hearing all unresolved conditions that resulted in the issuance of a facsimile (step S210), or (3) amending the system to change a delivery status of an individual delivery to indicate that a delivery is completed, is not completed, that a delivery is open, or that a delivery has been deleted (step S212). It is noted that if the user selects the option to learn a current status of the storage tank, step S214 is executed to convey the level of chemical in the storage tank, the condition of the system, and the next scheduled delivery of replacement (replenishment) chemicals.

The caller is able to select a plurality of options using a keypad of a conventional touch-tone telephone. For example, after the caller learns the current status of the storage tank, the user is prompted to enter another command, and may select, for example, to change a scheduled delivery date. When the user has completed using the voice menu feature of the system, he/she can terminate the call by pressing a preselected key on the touch-tone keypad of the telephone (such as, for example, the # key), or by hanging up the telephone.

Tank Read Program

Figure 6:
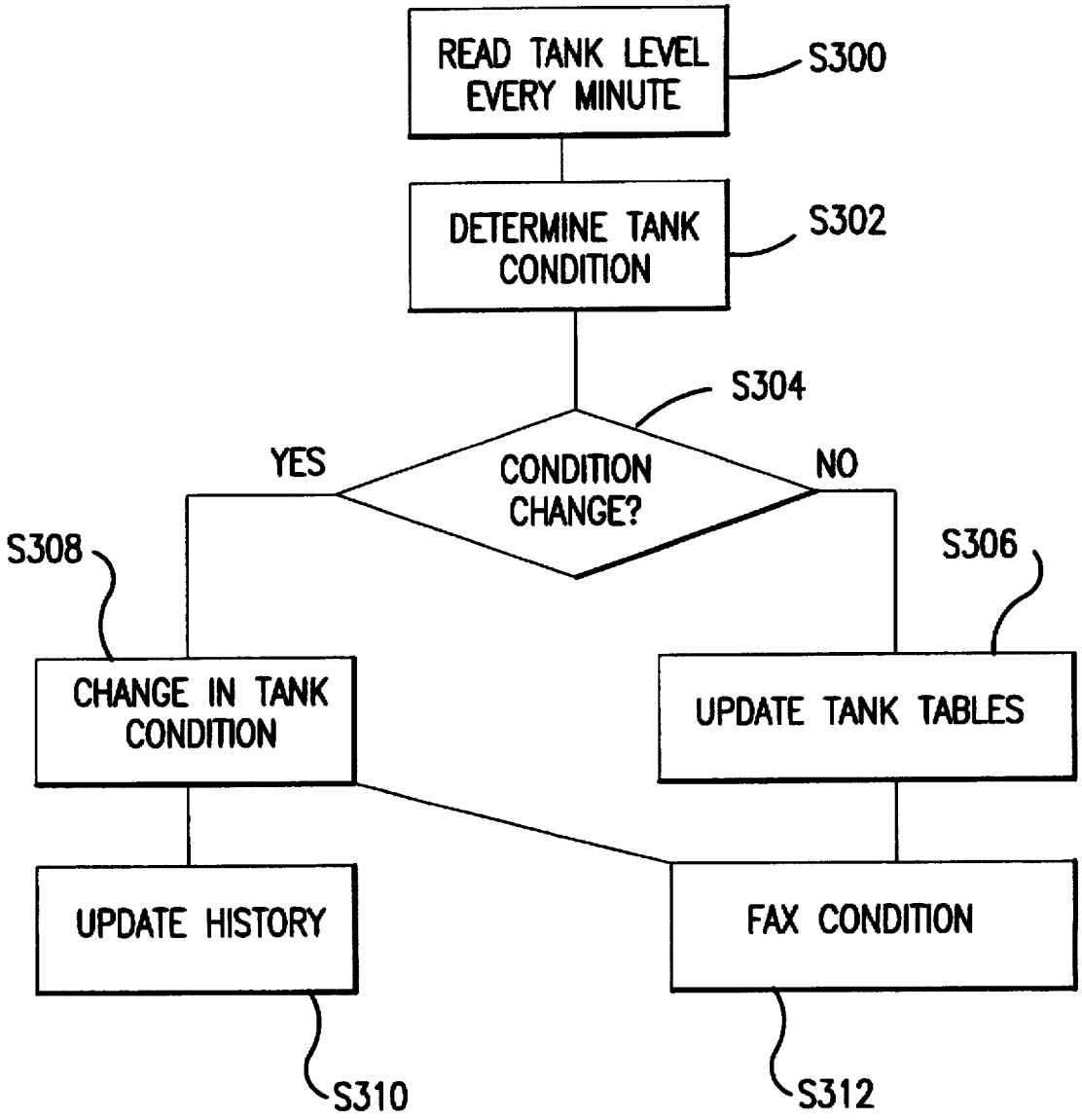
FIG. 6 illustrates a flow chart of a Tank Read Program executed by the processing unit of the preferred embodiment.

The Tank Read Program (FIG. 6) determines information concerning the level of chemical in the storage tank 102. In the preferred embodiment, the storage read operation polls the IMP interface module 104 approximately once every minute to determine a current level of the chemical in the storage tank (step S300).

According to step S300, if the IMP interface module fails to respond to the polling, a variable field BADRDS is incremented by a predetermined value, such as 1. A determination is then made as to whether the variable field BADRDS has reached a maximum set value. If the maximum set value for the variable BADRDS has not been reached, processing returns to the beginning of the routine to poll the IMP interface module 104 again. However, if the maximum value for the variable BADRDS has been reached, a facsimile (such as a READ_FAIL facsimile) is issued indicating that the IMP interface module 104 could not be polled, and the status of the storage tank 102 is set to inactive, preventing the automatic monitoring of the storage tank until the system is re-set.

Assuming the polling of the IMP interface module 104 brings a response, steps S302 and S304 are executed to determine the condition of the storage tank and whether the condition of the storage tank 102 has changed from a previous polling. In this regard, the preferred embodiment includes two databases, a Level 1 database table and a Level 2 database table. The Level 1 database table maintains a historical record of, for example, only the last few days worth of data points for the level of the chemical in the storage tank 102 at various times. The Level 2 database table maintains a historical record of significant occurrences and flow changes over, for example, a period of one year.

The Level 1 database stores data (step S306) related to, for example, the storage tank level, flow rate and flow status for a predetermined time interval when step S304 determines that there has not been a change in the condition of the level of the storage tank. The Level 2 database is updated (steps S308 and S310) when step S304 determines that the flow rate of the chemical in the storage tank 102 changes. Whether the condition of the storage tank has changed is determined in the preferred embodiment by comparing a previously stored flow rate to a present flow rate.

When a change is detected in the flow rate, the records of the Level 1 database are checked. If the Level 1 database records reflect a change in the flow rate of the chemical stored in the storage tank, the Level 2 database is updated and a facsimile (step S312) is issued reporting the change in the flow rate. The newly detected flow rate then replaces the previously stored flow rate to become the new reference value for determining a future flow rate change.

It is noted that a negative flow rate indicates that new (e.g., replacement) chemicals are being delivered. It is also noted that the filling of the storage tank represents a changed condition. Accordingly, a facsimile is sent by the Facsimile Program indicating that a delivery is occurring.

The processing unit uses an Electronic Data Interface (EDI) protocol that enables the processing unit 106 to communicate with a computer at a remote location. The Electronic Data Interface has been developed by the computer industry to enable dissimilar computer systems to communicate with one another. In the present invention, the Electronic Data Interface is employed to, for example, simplify the payment process for delivered chemicals, by, for example, eliminating human intervention. For example, a bill of lading and an invoice is typically prepared when replacement (replenishment) chemicals are shipped. However, the user of the chemical generally does not pay for supplies until they are actually delivered. The processing unit 106 validates that the delivery was in fact made by determining that the level of chemical in the storage tank increases. The processing unit 106 communicates the receipt of the supplies, to, for example, a computer system associated with an accounting department by, for example, a modem to modem communication to authorize payment of the delivered supplies.

As noted above, the present invention is capable of monitoring a plurality of storage tanks. Each storage tank has an associated IMP interface module; however, the circuitry for multiple IMP interface modules may be incorporated into a chassis. If every IMP interface module fails to respond to the polling request, the processing unit 106 assumes a loop failure exists, and sets the system to indicate that a general failure exists, so that the inventory management system 10 is rendered inoperative.

Facsimile Program

The Facsimile Program (FIG. 7) is executed every preselected time period, such as, for example, every minute. Initially, a timer counter is re-set to 0 (step S300). Thereafter, a determination is made as to whether the preselected time period has elapsed and a facsimile needs to be sent (step S400). If the pre-selected time period has not elapsed, processing waits until the pre-selected time period elapses. When the pre-selected time period elapses, the Facsimile Program determine who needs to be notified and sends appropriate facsimiles (steps S402 and S404).

The Facsimile Program assigns an ID code to the facsimile and updates the Voice Program (discussed above) so as to provide an announcement the next time a user having the same ID code accesses the system, and to confirm that the facsimile was received. If the processing unit does not receive a response to the issued facsimile (which is accomplished, for example, by examining the ID code associated with the acknowledgement) within a predetermined period of time, the processing unit 106 sends additional facsimiles to additional individuals, pursuant to a stored list of individuals (steps S410–S414). Accordingly, all responsible individuals are kept appraised of the operating status of the inventory management system 10.

If an acknowledgement is received (e.g., the ID code of the acknowledgement matches the ID code on the issued facsimile), no further action is required. However, the inventory management system continues monitoring the condition of the storage tank 102 (step S416 and S418) if the sent facsimile is not acknowledged at step S410 or it is not necessary to send additional facsimiles (step S412), and the condition initiating the sending of the facsimile is resolved. However, if the condition has not been resolved, the facsimile is re-sent (step S414).

Timer Program

Figure 8:
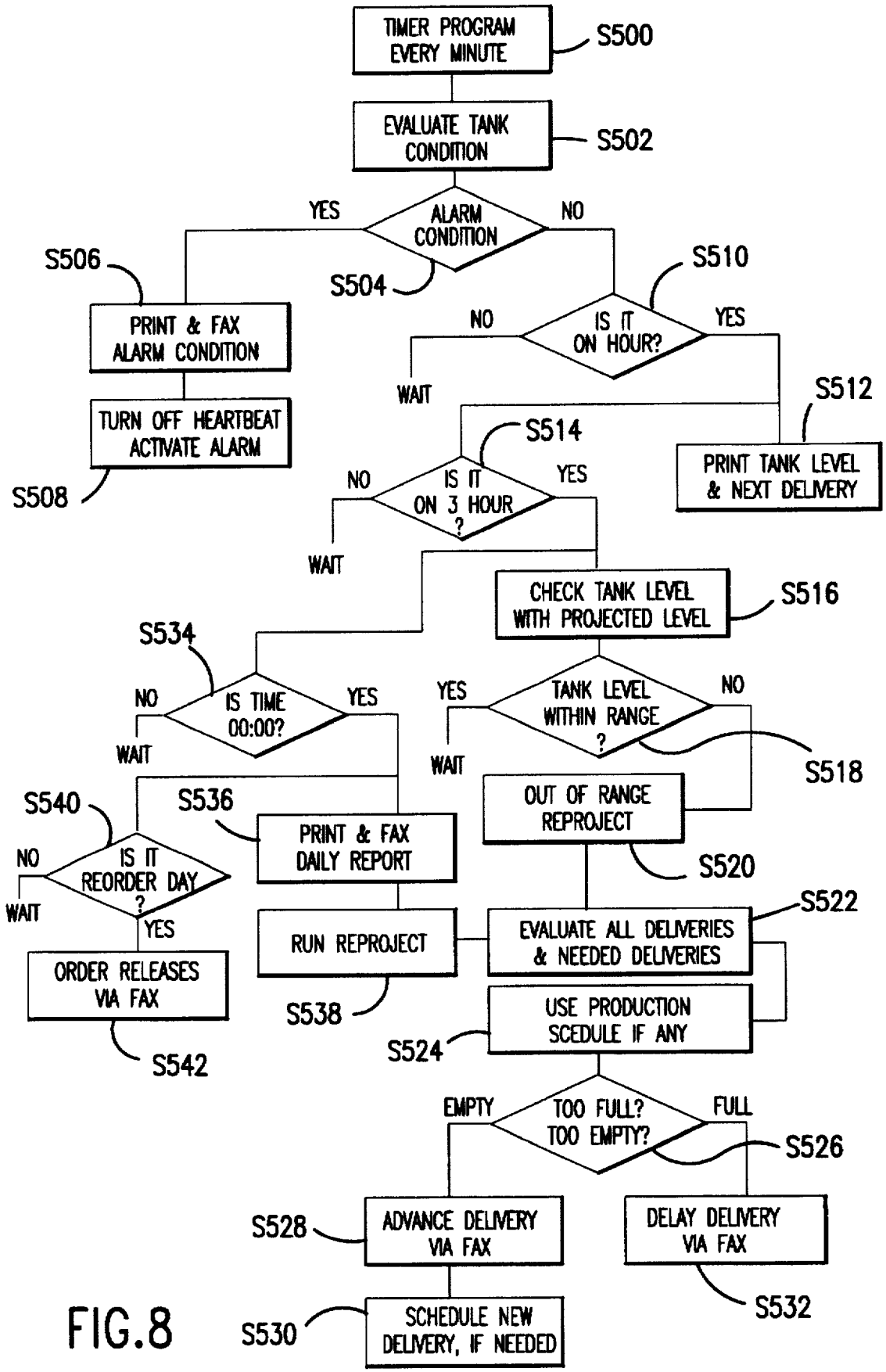
FIG. 8 illustrates a Timer Program executed by the processing unit of the preferred embodiment.

The Timer Program (FIG. 8) regulates the functions of the inventory management system 10 which occur on a scheduled time of day or day of the week. The timer routine controls the execution of a daily report operation at a predetermined time, such as, for example, every midnight, that produces a report of chemical usage, received deliveries of new chemicals, orders for chemicals during the past twenty-four hours, and statistics on facsimile messages issued during the last twenty-four hours.

According to this program, a system status check is performed every minute to determine the condition of the storage tank 102 (steps S500 and S502). If an abnormal condition exists, a facsimile is sent to an appropriate individual reporting the problem, and the local printer 118 prints a report indicating the problem (steps 504 and S506). If the abnormal condition is serious, an alarm is activated and the "heartbeat" signal is stopped, disabling the automatic operation of the inventory management system (step S508). For example, if the IMP interface module 104 continuously fails to respond to the polling request (discussed above with respect to the Tank Read Program) the "heartbeat" of the Heartbeat box module 108 is suspended and a facsimile is issued reporting a problem.

The Timer Program also produces a report of the current status of the storage tank along with the next scheduled delivery date once each hour (steps S510 and S512). The timer report also calls the facsimile routine to issue a notification facsimile (discussed above) if the processing unit 106 determines that a scheduled delivery is late.

According to the preferred embodiment of the invention, a projected storage tank level is compared to the actual level once every three hours. If a difference between the projected level and the actual level exceeds a predetermined threshold value, the projected levels are re-calculated using the last three hour flow rate. If future deliveries of replacement chemicals will be too early (or too late) to maintain suitable storage tank levels (based upon the projected storage tank level), the delivery schedule for new chemicals is adjusted and a facsimile is issued to reflect the changed delivery schedule (steps S514–S522).

In this regard, a determination is made as to whether the level of the storage tank is too high or too low. If the tank level is too high or too low, the information is recorded to a respective HIGH_LVL or LOW_LVL field and a facsimile is issued reporting the abnormality (steps S524–S532). On the other hand, if the tank level is within a normal range, the level in the storage tank is recorded and processing waits for the expiration of the time period to perform a new polling.

At midnight of each day, a daily summary report is provided indicating the quantity of chemical in the storage tank 102 that was expended, any messages that were sent during the preceding twenty-four hour time period, and the number of responses to those messages (steps S534–S538). In addition, the inventory management system determines whether the it is time to re-order replacement (replenishment) chemicals according to a predetermined delivery schedule If additional releases of chemicals are required from the supplier, the inventory management system transmits a facsimile requesting a delivery of chemicals (steps S540 and S542).

While the preferred embodiment of the instant invention performs certain tasks at specified time intervals (i.e., every minute, every hour, etc.) it is understood that other time intervals may be used without diverting from the spirit and/or scope of the instant invention.

While the invention has been particularly shown and described with reference to a preferred embodiment thereof, it is understood by those skilled in the art that various alterations in form and detail may be made without departing from the spirit and scope of the invention as defined by the following claims. For instance, instead of communicating over a conventional telephone line using a modem, an Integrated Services Digital Network (ISDN) can be employed to provide faster throughput. Alternatively, each routine can be combined into a single program that operates under a nonmulti-tasking operating system.

We claim:

1. A consumable supplies monitoring and ordering system, comprising:

a sensor that detects a quantity of said consumable supplies;

means for determining usage information of said consumable supplies for a predetermined period of time in response to a signal from said sensor; and means for modifying scheduled deliveries of additional consumable supplies based upon historical rates of consumption of said consumable supplies, in accordance with said usage information determined by said determining means and said detected quantity of consumable supplies.

2. The monitoring and ordering system of claim 1, wherein said sensor comprises a differential pressure cell, sensor.

3. The monitoring and ordering system of claim 2, further comprising means for converting a signal produced by said differential pressure cell sensor to a digital signal.

4. The monitoring and ordering system of claim 1, further comprising means for converting an output signal of said sensor to an RS-232 signal.

5. The monitoring and ordering system of claim 4, further comprising means for providing a local indication of said quantity of consumable supplies.

6. The monitoring and ordering system of claim 1, further comprising an alarm that is activated when said determining means determines an abnormal condition.

7. The monitoring and ordering system of claim 1, further comprising means for providing status information related to said consumable supplies.

8. The monitoring and ordering system of claim 1, further comprising means for remotely accessing said monitoring and ordering system.

9. The monitoring and ordering system of claim 1, further comprising means for verbally conveying information related to said consumable supplies to an authorized user.

10. The monitoring and ordering system of claim 1, further comprising means for ascertaining an operating condition of said sensor, said ascertaining means issuing an alarm when said operating condition comprises an abnormal condition.

11. The monitoring and ordering system of claim 10, further comprising means for activating a remote alarm when said ascertaining means ascertains said abnormal condition.

12. The monitoring and ordering system of claim 1, further comprising means for acknowledging delivery of said additional consumable supplies.

13. The monitoring and ordering system of claim 12, wherein said acknowledging means authorizes payment for said delivered additional consumable supplies.

14. A consumable supplies monitoring and ordering system, comprising:

a sensor that detects a quantity of consumable supplies stored in a storage facility, said sensor outputting a signal related to said quantity of stored consumable supplies;

a converting device that converts said output signal of said sensor to a predetermined signal;

a processing unit that receives said predetermined signal to determine usage information of said consumable supplies over a predetermined period of time, said processing unit employing said usage information to project when said consumable supplies will be completely depleted; and means for communicating with a supplier of said consumable supplies to modify a scheduled delivery of additional consumable supplies, based upon the projection of when said consumable supplies will be depleted, if said scheduled delivery would result in an undesirable quantity of stored consumable supplies.

15. The monitoring and ordering system of claim 14, further comprising a local alarm that is activated when said converting device fails to provide said predetermined signal to said processing unit.

16. The monitoring and ordering system of claim 15, further comprising a remote alarm, said remote alarm being activated along with said local alarm.

17. The monitoring and ordering system of claim 16, wherein said remote alarm comprises a visual alarm indicator and an audible alarm.

18. The monitoring and ordering system of claim 17, further comprising means for disabling said audible alarm.

19. The monitoring and ordering system of claim 14, further comprising means for accessing said processing unit from a remote location.

20. The monitoring and processing system of claim 19, wherein said accessing means comprises a voice card associated with said processing unit that responds to predetermined audio signals.

21. The monitoring and ordering system of claim 20, wherein said predetermined audio signals comprise touch-tone signals produced by a touch-tone telephone.

22. The monitoring and ordering system of claim 14, said processing unit issuing additional communications if said supplier fails to respond to a communication within a predetermined period of time.

23. The monitoring and ordering system of claim 14, further comprising means for compiling history data pertaining to said usage of said consumable supplies over time, said history data being used to adjust future scheduled deliveries of additional consumable supplies.

24. The monitoring and ordering system of claim 23, further comprising a printer that provides a printout of said history data.

25. The monitoring and ordering system of claim 14, further comprising means for issuing a warning when said processing unit determines that said usage of said consumable supplies exceeds a usual consumption rate.

26. The monitoring and ordering system of claim 25, wherein said issuing means further comprises means for issuing a warning when said usage of said consumable supplies is less than said usual consumption rate.

27. The monitoring and ordering system of claim 14, said converting means further comprising means for producing a second predetermined signal, said second predetermined signal being supplied to a usage indicator associated with said storage facility.

28. A monitoring and ordering system, comprising:

a sensor that detects a quantity of supplies;

means for determining usage information of said supplies for a predetermined period of time based upon a signal from said sensor; and means for scheduling deliveries of additional supplies based upon a rate of consumption of said supplies, in accordance with said usage information determined by said determining means and said quantity of supplies detected by said sensor.

29. A method for monitoring and ordering supplies stored in a storage facility, comprising the steps of:

sensing a quantity of supplies stored in the storage facility;

determining a rate at which the stored supplies are consumed based upon the sensed quantity of supplies stored in the storage facility;

ascertaining a modified delivery request schedule of replacement supplies based upon the sensed quantity of stored supplies and the rate at which the stored supplies are being consumed; and communicating the modified delivery request schedule to a supplier of the supplies.

30. The method of claim 29, further comprising the step of notifying monitoring personnel when a sudden change occurs in the rate at which the stored supplies are consumed.

31. The method of claim 30, further comprising the step of issuing additional notifications when the monitoring personnel fail to acknowledge receipt of an initial notification within a predetermined period of time.

32. The method of claim 29, further comprising the step of activating an alarm when an abnormal condition arises.

33. The method of claim 32, further comprising the step of compiling historical data pertaining to usage of the supplies over time.

* * * * *